April 12, 1927.

G. H. KERN

MOTION PICTURE MACHINE

Filed Dec. 2, 1921  4 Sheets-Sheet 1

1,624,667

Inventor
George H. Kern
By J. R. Cornwall
Atty

April 12, 1927.

G. H. KERN 1,624,667

MOTION PICTURE MACHINE

Filed Dec. 2, 1921

Inventor
George H. Kern
By F. R. Cornwall Atty.

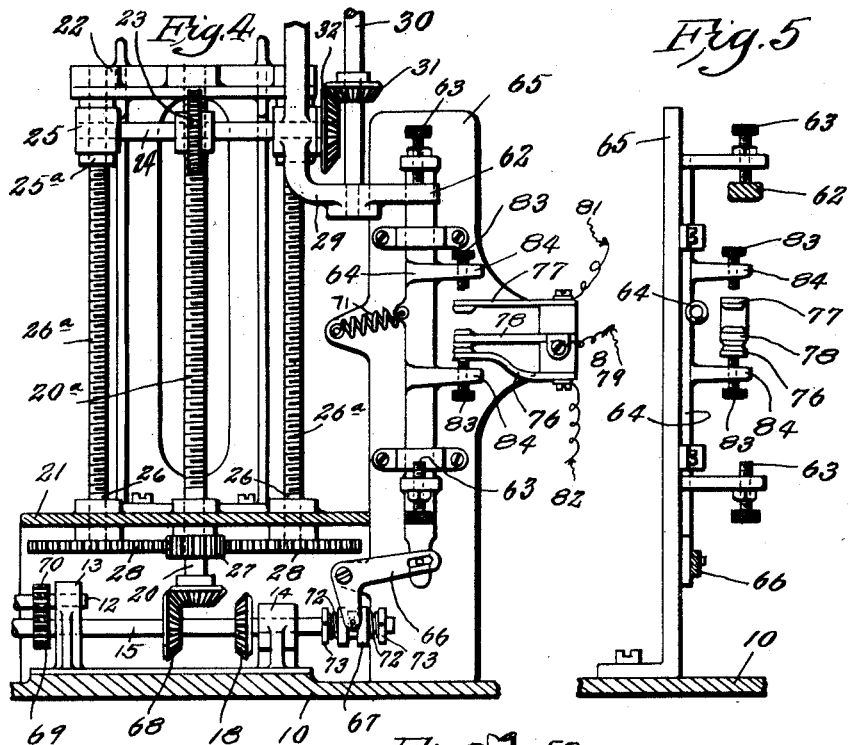
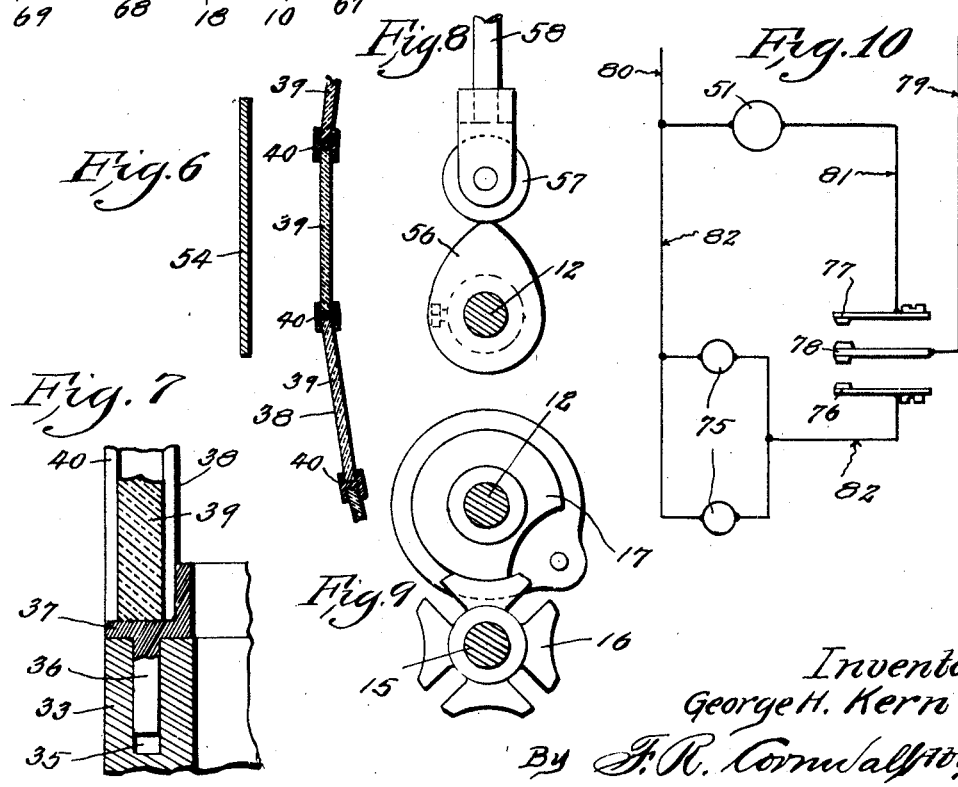

April 12, 1927.  G. H. KERN  1,624,667
MOTION PICTURE MACHINE
Filed Dec. 2, 1921  4 Sheets-Sheet 4

Patented Apr. 12, 1927.

1,624,667

UNITED STATES PATENT OFFICE.

GEORGE H. KERN, OF LOS ANGELES, CALIFORNIA, ASSIGNOR TO THE PRODUCERS PICTURES CORPORATION, OF ST. LOUIS, MISSOURI, A CORPORATION OF DELAWARE.

MOTION-PICTURE MACHINE.

Application filed December 2, 1921. Serial No. 519,461.

This invention relates generally to motion picture machines, and more particularly to that class of motion picture machines in which the pictures or positives are arranged in a predetermined manner on a suitable container and the machine is automatic in its action so that the projecting operations can be automatically repeated.

The objects of the invention are to provide a motion picture machine which is compact in size, automatic and positive in operation, contains few operating parts, so that the danger of the machine getting out of order is reduced to minimum, and is inexpensive to manufacture.

Further objects of the invention are to provide a motion picture apparatus in which the pictures are mounted on a removable holder or container which can be easily and quickly removed from its position on the machine and another one having a different series of pictures readily placed in its position; and to provide mechanism for imparting intermittent rotary motion to said holder, and for feeding said holder intermittently in one direction in synchronism with said intermittent rotary movement, whereby each picture is properly positioned for a suitable period of time in a projecting position; and to provide means for automatically restoring said holder or container to its starting position.

Still further objects of my invention are to provide a motion picture machine in which the pictures or positives to be projected are arranged successively in the form of a screw-thread or spiral on the circumference of a suitable holder.

Still another object of the invention is to provide an auxiliary display sign operable in conjunction with said motion picture machine whereby when the projecting mechanism is being restored to its starting position, said sign will be illuminated and the projecting means on the machine will be rendered inoperative.

With these and other objects in view, my invention consists in certain novel features of construction and arrangements of parts hereinafter described and claimed and illustrated in the accompanying drawings in which,—

Figure 4 is a detail view of the actuating mechanism showing parts thereof in moved position.

Figure 5 is a side elevation of the means used for controlling the electric circuit of the lamps.

Figure 6 is a horizontal cross-section through a shutter and a portion of the holder.

Figure 7 is a detail sectional view of the turntable with the holder positioned thereon.

Figure 8 is a detail view of the shutter actuating mechanism.

Figure 9 is a detail view showing means for imparting intermittent motion to the projecting mechanism.

Figure 10 is a diagrammatic view of the lamps and the circuits therefor.

Figure 1:
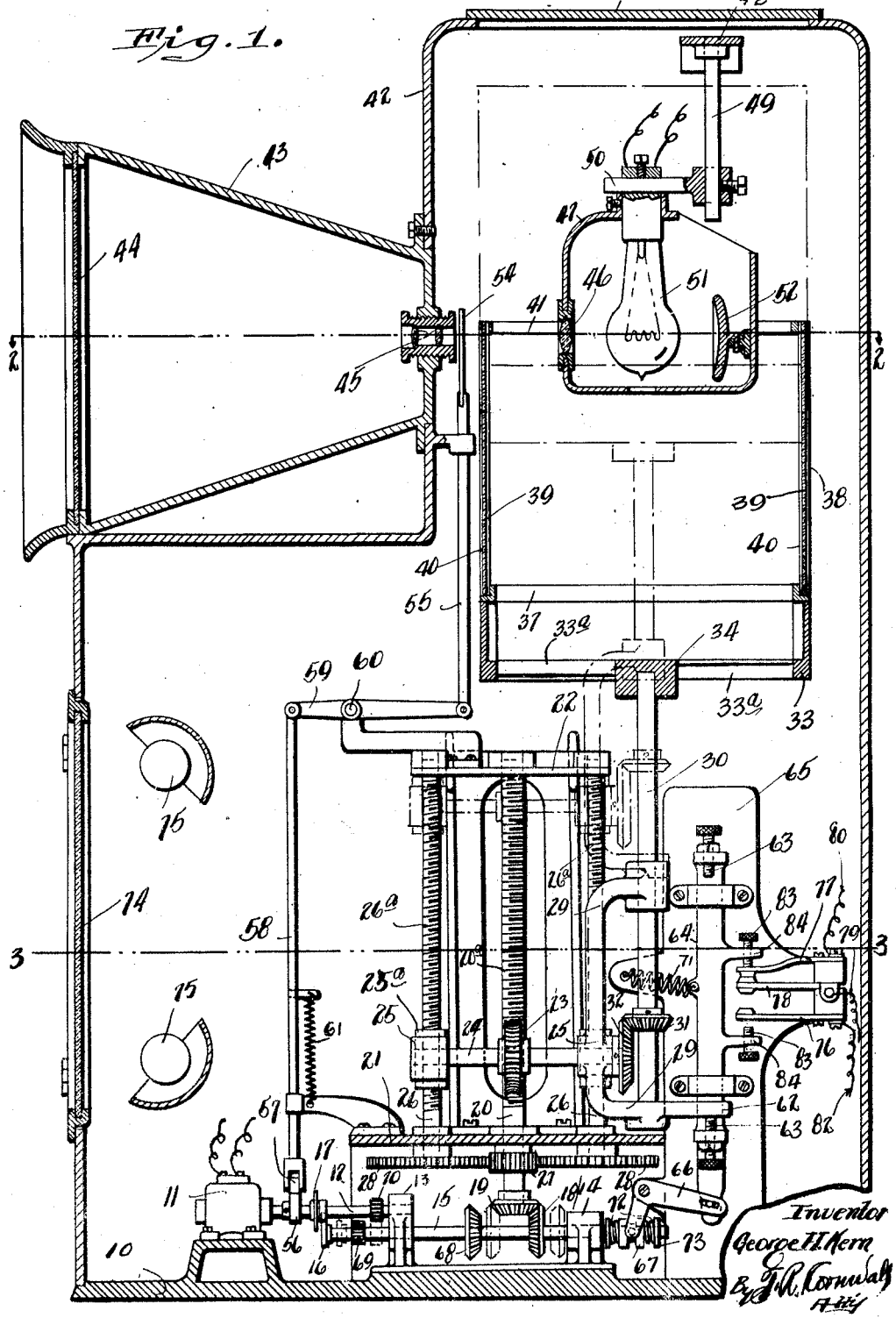
Figure 1 is a vertical cross section of the motion picture machine.
Figure 2:
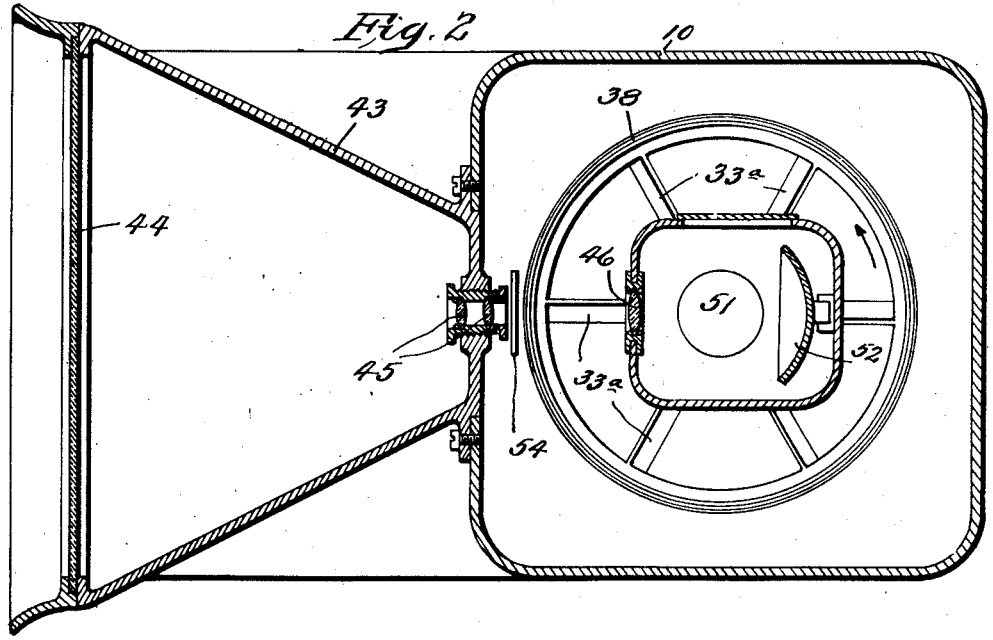
Figure 2 is a horizontal cross-section taken on line 2—2 of Figure 1.
Figure 3:
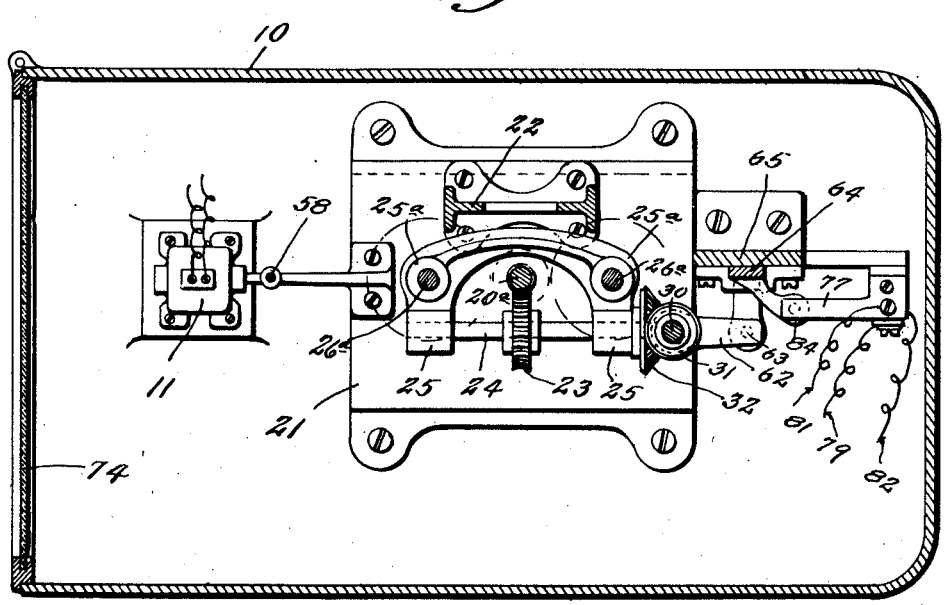
Figure 3 is a horizontal cross-section taken on line 3—3 of Figure 1.

Referring by numerals to the accompanying drawings, 10 designates a base on which is supported a motor 11 having a driving engagement with one end of shaft 12, the other end of which shaft is journaled in bearing 13 projecting upwardly from base 10. Slidably mounted in bearings 13 and 14 is a shaft 15 which has a driven member 16 of a Geneva movement fixed to its forward end. The driving member 17 of said Geneva movement is fixed to shaft 12 and intermittently operates member 16. A bevel gear 18 is fixed to shaft 15 and is in mesh with a bevel gear 19, which is fixed to the lower end of a shaft 20. This shaft is vertically disposed and is journaled adjacent to its lower end in a bearing formed on the casting 21, which casting is supported on base 10, and the upper end of said shaft is journaled in a bearing formed on casting 22 projecting upwardly from casting 21. Shaft 20 is provided with a worm or screwthread 20ᵃ which is in driving engagement with a worm gear 23 fixed to a shaft 24, the latter being horizontally disposed and journaled in bearings 25. Extensions 25ª are formed integral with bearings 25 and have an operative engagement with worms or screw-threads 26ª formed on shafts 26. These shafts are disposed on either side of and parallel with shaft 20 and their ends are journaled in bearings formed on castings 21 and 22. Shafts 26 are driven at a given speed with respect to shaft 20 by means of a pinion 27 fixed to the lower end of shaft 20 and meshing with gears 28 fixed to the lower end of each shaft 26. Projecting from one of the bearings 25 are brackets 29 provided with vertically alined bearings in which is journaled and supported the lower end of a vertically disposed shaft 30. This shaft is actuated by means of a bevel gear 31 fixed thereto and in driving engagement with a bevel gear 32 which is fixed to the corresponding end of shaft 24. Shaft 30 extends upwardly and carries at its upper end a turntable 33 having radially disposed fan blades or spokes 33ª and a hub 34 in which the upper end of shaft 30 is fixed. Turntable 33 is provided with a series of pockets or recesses 35 in which are adapted to be seated pins or projections 36 extending downwardly from a base ring 37, which latter forms the base of a drum or holder 38.

This holder, which is tubular in form, is provided in its periphery with a series of vertically disposed openings which are adapted to slidably receive plates 39 on which are arranged pictures or positives desired to be projected. The openings or pockets are preferably formed by means of vertically disposed bars 40 which are H-shaped in cross section and circumferentially arranged at spaced intervals in position. The lower ends of these bars are secured to base ring 37 and the upper ends are secured to a top ring 41.

Resting on base 10 and enclosing the mechanism just described is a housing 42 having a hood 43 arranged on its forward upper end. The outer end of this hood is provided with a screen 44 of translucent material and the inner end of said hood is provided with wide angle projecting lenses 45 which are in alinement with a condensing lens 46 carried in the forward wall of a casing 47.

Detachably supported on the side walls of housing 42 is a bracket 48 having a downwardly extending rod 49. Adjustably supported on this rod is a bar 50 and suspended therefrom is casing 47.

A source of light, preferably an electric lamp, 51 is arranged within casing 47 in alinement with lenses 45 and 46. A reflector 52 is placed in casing 47 rearwardly of lamp 51 and concentrates the rays of light towards the condensing lens 46. The upper end of housing 42 is provided with an opening having a closure member 53 through which opening bracket 48 and casing 47 can be detached from their position in housing 42 when it is desired to remove or substitute another holder in position on turntable 33.

Interposed between holder 38 and projecting lenses 45 is a vertically movable shutter 54 carried by the upper end of a rod 55 and operable by means of a cam 56 adjustably fixed on shaft 12 and engaging a roller 57 carried by the lower end of rod 58. The upper end of this rod is connected to one end of lever 59 which is pivotally mounted at 60 and has connected to its opposite end the lower end of rod 55. A spring 61 tends to hold roller 57 in engagement with cam 56, and maintain shutter 54 in its operative position.

The pictures or positives designed to be projected are spirally arranged on the holder or container 38 and are placed in the projecting position in their proper sequence by the actuation of said holder. These pictures or positives are preferably arranged in a predetermined series on each strip or plate 39, which strips are produced in accordance with the method disclosed by me in a copending application for United States Letters Patent, Serial No. 508,863 filed October 19, 1921.

The holder 38 is revolved in the proper direction by means of shaft 30 which is driven from slidable shaft 15 through bevel gears 18 and 19, worm 20ª and worm gear 23, and bevel gears 31 and 32. Shaft 15 is adapted to be intermittently operated by means of members 16 and 17 and this intermittent motion is transmitted to holder 38 so that each picture on said holder is placed in projecting position for a predetermined period of time. In order to take care of the variance in the elevation of the adjoining pictures, which variance is due to their spiral arrangement, holder 38 is intermittently fed upwardly simultaneously and in time relation with its intermittent revolving movement. This movement of holder 38 in the axial direction is caused by the rotation of shafts 26, the worm portion 26ª of which has operative engagement with extensions 25ª of the bearings in which shaft 24 is journaled and one of which bearings supports brackets 29 which carry shaft 30 and holder 38.

In order to automatically restore holder 38 to its starting position, one of the brackets 29, and preferably the lower one, is provided with an extension 62 which is adapted to engage pins or screws 63 occupying positions in the path of movement of said extension. One of these pins is adapted to be engaged just before the completion of the upward movement of the holder and the other of said pins is arranged to be engaged before the completion of the downward or restoring movement of said holder. These pins are adjustably seated in lateral lugs or projections formed on a vertically disposed bar 64 slidably mounted on a plate 65 to one side of shaft 30. The lower end of this bar has a slot and pin connection with one arm of a bell-crank 66 which bell-crank is pivotally mounted on plate 65 and has its other arm bifurcated and engaging a grooved sleeve 67 which is carried by the rear projecting end of slidable shaft 15. Shaft 15 carries a bevel gear 68 which is oppositely disposed with respect to bevel gear 18, as shown in Figure 1. A gear 69 is fixed to shaft 15 and is adapted to enter into driving engagement with a similar gear 70 fixed to shaft 12. Normally, i. e., during the projecting operations of the machine, bevel gear 18 is in mesh with bevel gear 19 and the shaft is intermittently actuated by members 16 and 17, while bevel gear 68 is disengaged from bevel gear 19 and gear 69 is disengaged from gear 70. When holder 38 reaches, in its upward movement, a predetermined point, extension 62 impinges against pin 63 carried by the upper end of bar 64, causing said bar to move upwardly, thereby rocking through its engagement with the lower end of said bar bell-crank 66 so that shaft 15 is shifted longitudinally in bearings 13 and 14, thereby moving bevel gear 18 out of engagement and moving bevel gear 68 into engagement with bevel gear 19. Simultaneously with the shift of bevel gears 18 and 68 the intermittent drive is disconnected by virtue of the fact that member 16 is moved out of engagement with member 17.

Immediately after the disabling of the intermittent drive, gear 69 is moved into mesh with gear 70, whereby shaft 15 is driven constantly by shaft 12. The direction of operation of shaft 20 and the mechanism operated thereby will be reversed in view of the fact that the bevel gear 19 is now in driving engagement with bevel gear 68 which is oppositely disposed with respect to bevel gear 18. The reversing of the direction of operation of shaft 20 and the mechanism driven thereby will cause holder 38 to move downwardly to its starting position at a greater rate of speed and this downward, or restoring, movement of said holder will continue until extension 62 impinges against pin 63 carried by the lower end of bar 64, whereupon said bar will be moved downwardly rocking bell-crank 66 so as to cause shaft 15 to move longitudinally and forwardly thereby disengaging bevel gear 68 from bevel gear 19 and moving gear 69 out of mesh with gear 70 and establishing driving connection between bevel gears 18 and 19 and intermittent mechanism 16 and 17. An expansion spring 71, one end of which is anchored to a stationary support, such as plate 65 and having its other end pivotally connected to bar 64, tends to retain said bar in its moved position and prevent accidental displacement thereof. Collar 67 is preferably mounted between two coiled springs 72, the outer ends of which bear against collars or shoulders 73 which are fixed on shaft 15. These springs are of sufficient strength to normally form operative connection between sleeve 67 and shaft 15 and permit slight yielding movement of said sleeve on said shaft under abnormal conditions and thus eliminate injury to the mechanism.

Located in the front wall of housing 42 adjacent to screen 44 is a display sign 74 which is designed to be illuminated by lamps 75 arranged within housing 42. Lamps 75 and lamp 51 are controlled by means of yielding contacts 76 and 77 carried by and insulated from plate 65 and adapted to ultimately engage a stationary contact 78 connected to one of the supply lines 79. The other supply line 80 is connected to an electric circuit 81 which is controlled by contact 77 and electric circuit 82 which is controlled by contact 76. Lamp 51 is interposed in circuit 81 and becomes energized when contact 77 is moved into engagement with contact 78 and lamps 75 are interposed in circuit 82 and are energized when contact 76 is moved into engagement with contact 78. The positioning of contacts 77 and 76 in engagement with contact 78 is accomplished by means of pins or screws 83 which are adjustably seated in arms 84 formed on bar 64 and operable by means of said bar to move the corresponding yielding contact into engagement with contact 78 in co-operation with the movement of holder 38. Thus, during the projecting or opening movement of said holder, bar 64 will occupy its lowermost position and pin 83 carried by the upper one of arms 84 will hold yielding contact 77 in engagement with contact 78 so that the source of light 51 will be energized as illustrated in Figure 1.

Just before the completion of the upward movement of holder 38, bar 64 is operated by extension 62 and moved upwardly, whereby contact 77 is disengaged from contact 78 connecting at lamp 51 and contact 76 is positioned in engagement with contact 78 completing the circuit of lamps 75 so that the projecting means are rendered inoperative during the restoring movement of holder 38 and at the same time display sign 74 is illuminated, the fan blades 33ᵃ cause the air to circulate through the holder 38 and casing 47 during the operation of the machine.

Figure 11:
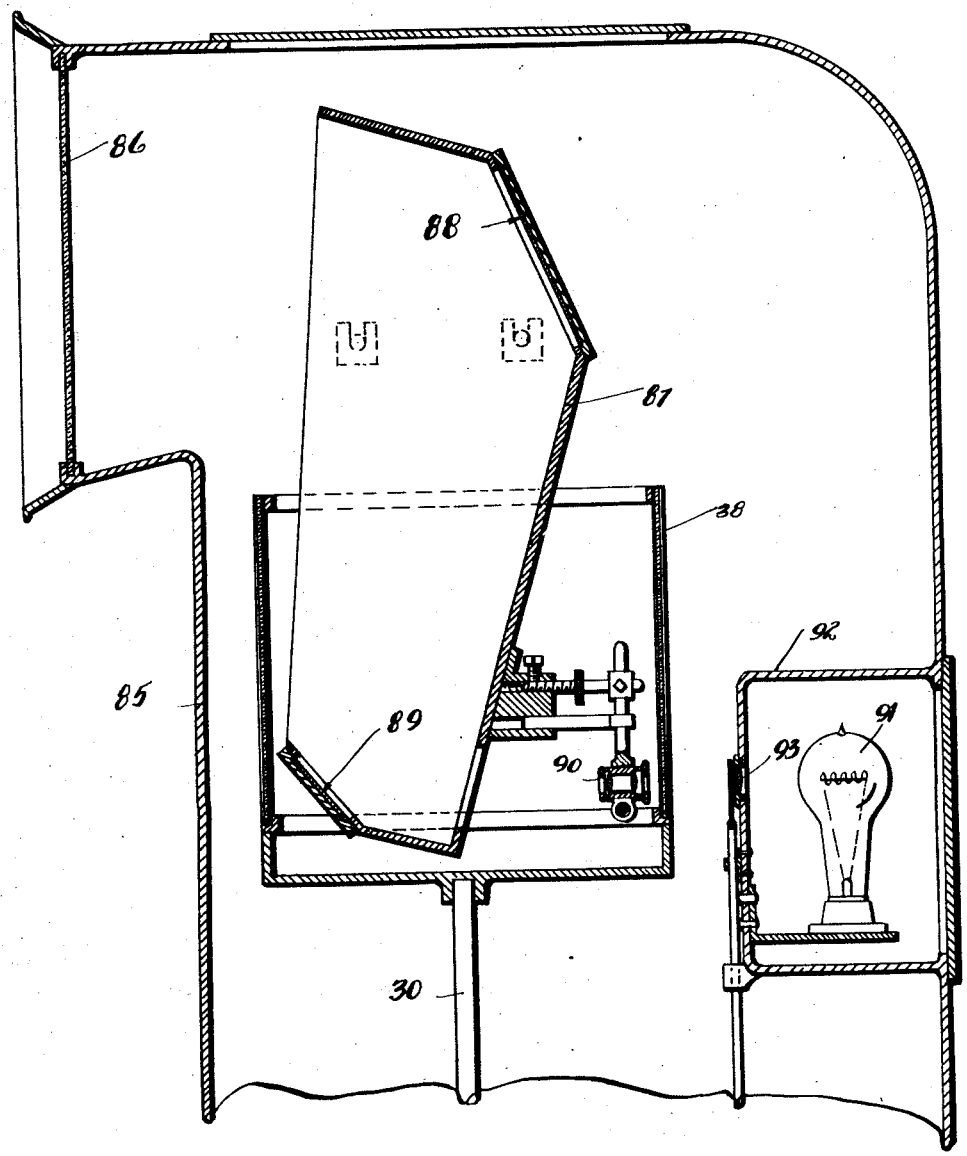
Figure 11 is a vertical cross-section of a modified form of my motion picture machine.

In the modified form of my invention shown in Figure 11, the housing 85 is provided at its upper end with a screen 86, and detachably arranged within said housing is a hood or periscope 87 having a reflector 88 in its upper end and a reflector 89 in its lower end. The lower end of this periscope is adapted to extend within the holder 38 and is provided in its rear wall with an opening which is in alignment with the reflector 89 and projecting lenses 90, which latter are adjustably supported from the rear wall of said periscope. The lamp or source of light 91 is located in a compartment 92 formed within said housing and having a condensing lens 93 in its inner wall in front of lamp 91. The pictures or positives desired to be projected are interposed between lens 90 and lens 93 and are projected onto the reflector 89 which reflects the image upwardly against the reflector 88 which then reflects it outwardly onto screen 86. This method of projecting pictures or positives onto the screen is particularly adapted for use where large magnification of the picture is desired within a restricted space.

My motion picture apparatus is automatic in its operation and will repeat the projecting operations as often as desired. The operating mechanism is positively driven, thereby insuring accurate fixing and positioning of the pictures. The machine occupies very little space and is so designed as to provide all the available space for display purposes when used as an advertising device.

The machine is equally well adaptable for use in schools, demonstrating purposes or wherever a compact and simple motion picture machine is desired.

While I have shown the preferred forms of my motion picture machine, it is obvious that various changes in the construction and arrangement of parts can be made and substituted for those herein shown and described without departing from the spirit of my invention.

What I claim is:

1. In a motion picture machine, a holder for receiving pictures, a screen, means for projecting said pictures onto said screen, means for revolving said holder, feeding means for moving said holder in axial direction, means for actuating said revolving and said feeding means intermittently in one direction and at a constant speed in the opposite direction, and means for disabling said projecting means during the return movement of said holder.

2. In a motion picture machine, a holder for receiving pictures, a screen, means for projecting said pictures onto said screen, actuating mechanism for intermittently operating said holder in one direction whereby said pictures are successively presented in projecting position, said mechanism being adapted to return said holder to its starting position, and means operable in time relation with said actuating mechanism for maintaining said projecting means operative during the projecting operation and for disabling said projecting means during the return movement of said holder.

3. A motion picture apparatus comprising a turntable, a shaft carrying said turntable, means for intermittently operating said shaft, means for feeding said shaft in axial direction in time relation with its revolving movement, a screen, projecting means, and a holder detachably supported on said turntable and having a plurality of pictures arranged thereon in planes at right angles to the radii of said holder whereby when said turntable is actuated said pictures are successively projected onto said screen.

4. In a motion picture apparatus, a turntable, a shaft carrying one end of said turntable, a support for said shaft, means for intermittently actuating said shaft about its axis, means for intermittently feeding said support in axial direction of said shaft in time relation with its revolving movement, a screen, projecting means, a holder detachably mounted on said turntable and provided with a series of pictures adapted to be successively placed in a projecting position in a plane at right angle to the optical axis when said turntable is actuated, and means for restoring said support and parts associated therewith to its starting position.

5. A motion picture apparatus comprising a cylindrical holder having peripherally disposed thereon pictures or positives, a screen, means including a source of light for projecting said pictures onto said screen, mechanism for simultaneously actuating said holder revolubly and in axial direction whereby said pictures are successively placed in a projecting position, and means operable in correlation with said mechanism for disabling said source of light at a predetermined time.

6. A motion picture apparatus comprising a cylindrical holder having peripherally disposed thereon pictures or positives, a screen, means including a source of light for projecting said pictures onto said screen, mechanism for actuating said picture holder revolubly and in axial direction whereby said pictures are sequentially placed in a projecting position, a shutter for said projecting means operable in correlation with said mechanism, and means operable by said actuating mechanism for disabling said source of light.

7. A motion picture apparatus comprising a tubular holder having its peripheral face adapted to receive pictures or positives, a screen, means including a source of light for projecting said pictures onto said screen, mechanism for actuating said picture holder axially and revolubly in one direction whereby said pictures are placed in projecting position, means for restoring said picture holder to its starting position, and means operable in time relation with said picture holder for disabling said source of light during the restoring movement of said holder.

8. In a motion picture apparatus, a cylindrical picture holder, a screen, means including a source of light for projecting the pictures on said holder onto said screen, mechanism for actuating said picture holder revolubly and longitudinally, driving means for said mechanism, means for controlling said driving means whereby the direction of said mechanism is reversed at the end of the projecting operation and said holder is returned to its starting position, an electric circuit for said source of light, and means operable in time relation with said actuating mechanism for controlling said electric circuit, whereby said source of light is rendered inoperative during the restoring movement of said holder.

9. In a motion picture apparatus, a holder adapted to receive pictures or positives, a screen, means for projecting the pictures onto said screen mechanism for actuating said picture holder, said mechanism being adapted to return said holder at one end of the projecting operation to its starting position, a display sign, means controlled by the movement of said holder for rendering said projecting means inoperative and said display sign operative during the restoring movement of said holder.

10. In a motion picture apparatus, a picture holder, a screen, means including a source of light for projecting the pictures onto said screen, mechanism for actuating said picture holder whereby said pictures are sequentially placed in a projecting position, said mechanism being adapted at the end of the projecting operation to restore said picture holder to its starting position, a display sign, illuminating means therefor, and means for disabling said illuminating means during the projecting operation, and disabling said source of light during the restoring operation of the holder.

11. In a motion picture machine, a holder adapted to receive and maintain in operative positions a series of pictures, a screen, means including a source of light for projecting the pictures onto said screen, an electric circuit for said source of light, mechanism for actuating said picture holder whereby said pictures are sequentially placed in a projecting position, means for restoring said holder to its starting position, a display sign, illuminating means therefor, electric circuits for said source of light and said illuminating means, and means for controlling said electric circuits and operable in time relation with the operation of said holder.

12. In a moving picture machine, a tubular holder having a series of pictures operatively disposed thereon, a turntable adapted to detachably receive said holder, a screen, projecting means, means for intermittently revolving said turntable, means for intermittently moving said turntable in axial direction in time relation with the intermittent revolving movement whereby said pictures are successively placed in projecting position, and mechanism for said actuating means, said mechanism being operable at the completion of the projecting movement of said holder to reverse the direction of operation of said means whereby said holder is returned to its starting position.

13. In a motion picture apparatus, a housing, a screen, in one of the walls thereof, a casing detachably supported in operative position in said housing, a source of light in said casing, projecting means arranged in alignment with said screen and said source of light, a cylindrical holder having its periphery adapted to receive pictures or positives, said holder being operable revolubly and longitudinally to place said pictures in a projecting position relative to said source of light and said projecting means, mechanism for actuating said holder, and means for controlling said actuating mechanism and operable in time relation with the movement of said holder.

14. In a motion picture apparatus, a housing, a screen in one of the walls thereof, a casing detachably supported in operative position in said housing, a source of light in said casing, projecting means arranged in alignment with said screen and said source of light, a tubular holder having its peripheral wall adapted to receive pictures or positives, said holder being operable simultaneously in longitudinal and rotating directions to place said pictures in a projecting position relative to said source of light and said projecting means, and a shutter slidable into position between said projecting means and said holder and operable in time relation with the operation of said holder.

15. In a motion picture apparatus, a housing, a screen in said housing, a holder adapted to receive and maintain in operative positions a series of pictures, means including a source of light for projecting pictures onto said screen, an electric circuit for said source of light, means for actuating said picture holder whereby said pictures are sequentially placed in a projecting position, a display sign arranged in one of the walls of said housing, means for illuminating said display sign, and means for controlling said illuminating means in time relation with the operation of said holder.

16. A motion picture machine comprising a tubular container provided on its periphery with a series of openings adapted to receive pictures or positives, each of which occupies a plane at right angle to its respective radius, a screen, means for projecting said pictures onto said screen, mechanism for actuating said container whereby the pictures are successively placed in a projecting position, driving means for operating said container in one direction, and means operable in conjunction with said container for disabling said driving means.

17. A motion picture machine comprising a tubular container provided on its periphery with a series of openings adapted to receive pictures or positives, a screen, means for projecting said pictures onto said screen, mechanism for actuating said container whereby the pictures are successively placed in a projecting position, in a plane at right angle to the optical axis, driving means for actuating said mechanism in one direction and movable into a position to reverse the direction of operation of said mechanism, and means operable in co-operative relation with said container for controlling said driving means.

18. A motion picture machine comprising a tubular container adapted to receive pictures or positives, at right angles to the radii of said holder, a screen, means for projecting said pictures onto said screen, mechanism for actuating said container, movable means for actuating said mechanism, said movable means being adapted when in one position to actuate said mechanism, whereby the pictures or positives on said container are successively placed in a projected position in a plane at right angles to the optical axis, said means being movable into another position to reverse the direction of operation of the actuating mechanism, whereby said holder is restored to its starting position, and operative connections between said container and said movable means for positioning said movable means.

19. In a motion picture machine, a housing provided with a hood, a screen in the front portion of said hood, projecting lenses mounted rearwardly of said screen, a casing detachably supported in position in the upper portion of said housing, a source of light within said casing, a condensing lens mounted in said casing in alinement with said source of light and said projecting lenses, a tubular holder open at its upper end and provided in its periphery with a series of openings adapted to receive a series of pictures or positives, means for actuating said holder whereby said pictures are successively projected onto said screen, a displaceable member movable by said holder, flexible connection between said displaceable member and said actuating means and operable by said displaceable member to reverse the direction of operation of said actuating means, and means operable by said displaceable member in time relation with said actuating means for controlling said source of light.

20. In a motion picture machine, a housing having a translucent screen, a tubular holder provided with a series of pictures or positives, helically arranged thereon, each of said pictures being arranged to occupy a plane at right angle to the optical axis, a series of co-operating reflecting members, means including a source of light for projecting the pictures on said holder through the co-operation of said reflecting members onto said screen, and mechanism for actuating said holder whereby said pictures are successively placed in a projecting position.

21. In a motion picture apparatus, a housing having a translucent screen in one of its walls, a tubular holder provided with a series of pictures or positives arranged thereon in a helical form, each of said pictures being arranged to occupy a plane at right angles to the optical axis, means for projecting said pictures, reflecting means co-operating with said projecting means and adapted to reflect the projected image onto said screen in an enlarged form, and mechanism for actuating said holder whereby said pictures are placed in a projecting position in proper sequence.

In testimony whereof I hereunto affix my signature this 3rd day of October, 1921.

GEORGE H. KERN.